June 30, 1964 G. D. BARBER 3,139,595

VARIABLE PULSE WIDTH GENERATOR

Filed Feb. 24, 1960 2 Sheets-Sheet 1

INVENTOR.
GENE D. BARBER
BY Charles A. Weigel, Jr.
ATTORNEY

June 30, 1964 G. D. BARBER 3,139,595

VARIABLE PULSE WIDTH GENERATOR

Filed Feb. 24, 1960 2 Sheets-Sheet 2

INVENTOR.
GENE D. BARBER
BY Charles A. Weigel, Jr.
ATTORNEY

United States Patent Office 3,139,595

Patented June 30, 1964

3,139,595

VARIABLE PULSE WIDTH GENERATOR

Gene D. Barber, Escondido, Calif., assignor, by mesne assignments, to Control Data Corporation, Minneapolis, Minn., a corporation of Minnesota Filed Feb. 24, 1960, Ser. No. 10,674
6 Claims. (Cl. 332—12)

This invention relates to a pulse modulator, and more particularly to a blocking oscillator capable of generating pulses each having a width that is variable in accordance with the instantaneous magnitude and character of an input magnetic flux. The input magnetic flux may be established by electrical, electromagnetic, or mechanical means.

In a preferred embodiment of this invention, the pulse width modulator may be used as a detector or comparator for determining the relative magnitude of an input signal with respect to a reference.

Blocking oscillator circuits of many types have been known and used for some time for the generation of pulses having a duration of from about 0.05 to 25 microseconds. A rather thorough description of such circuits and an analysis of their operation may be found in Pulse and Digital Circuits by Millman and Taub, McGraw-Hill, 1956, on page 272, et seq. A listing of typical applications for a blocking oscillator is found on page 284 of this book. Unfortunately, existing blocking oscillators are not particularly suitable for use as pulse width modulators. Prior attempts to vary the width of the output pulses of conventional blocking oscillators have generally resulted in circuits that were comparatively costly, unstable in voltage, unstable in frequency, or relatively insensitive to small input signals.

Pulse width modulators are particularly useful in automatic control systems and the like, where it is frequently more important to detect relative changes rather than absolute values. In many applications, the system sensitivity is the critical factor in determining the accuracy and the utility of the system. For example, in a real time process control system, such as a refining process, small changes in temperatures, pressures, etc., must be accurately and rapidly detected. Detection of thermocouple currents less than one microampere are illustrative of the required sensitivity. Further, it is desirable that a modulator used in a control system be relatively isolated from the input electrical elements or physical quantities being detected, have low drift, and be capable of sampling the input signals at a relatively rapid rate.

Accordingly, it is an object of this invention to vary the width of the output pulses of a blocking oscillator as a function of an input magnetic flux.

It is another object of this invention to develop accurate pulse width modulated signals in response to relatively small input electrical, electromagnetic, or mechanical input signals.

An additional object of this invention is to provide means of significantly improved stability for developing sequential output pulses varying in width in accordance with an input signal.

A further object of this invention is to provide an improved device that is capable of generating repetitive output pulses each having a polarity and width that is variable in accordance with the instantaneous polarity and amplitude of relatively small input electrical, electromagnetic, or mechanical signals.

In a typical embodiment, the improved pulse width modulator of this invention includes a blocking oscillator to generate (or develop) sequential constant amplitude output pulses, each having a width that is variable in accordance with the amplitude of relatively small input signals. In accordance with the teaching of the present invention, a conventional free running blocking oscillator may be modified by the addition of means for varying the magnetic bias in the core of the feedback transformer in the blocking oscillator in response to the input signal variation to be detected. The consequent change of the quiescent magnetic operating point of the core causes the width of the sequential blocking oscillator output pulses to change as a function of the variation in the input signal so that the blocking oscillator operates as a pulse width modulator. The input signal to be detected may be an electrical modulating signal derived from a transducer such as a thermocouple. Alternatively, the input signal to be detected may be a mechanical movement coupled to vary the magnetic flux in the core of the feedback transformer thereby to vary the core's quiescent magnetic operating point and thus modulate the width of the blocking oscillator pulses.

In another embodiment of this invention, two driven blocking oscillators are operated in synchronism by a synchronizing pulse. An input modulating signal source is coupled to the core of each of the blocking oscillators in a differential manner, such as to apply a magnetizing force to the core of the first blocking oscillator in one sense and to the core of the other blocking oscillator in the opposite sense thereby varying the quiescent operating point of each of the cores in a differential manner. Output windings are also coupled to each of the cores and connected together in a differential manner, such that the flux changes occurring in each of the cores, during each cycle of oscillation of the blocking oscillator, effectively subtract from each other. This provides a resultant output pulse representative of the algebraic sum of the pulses induced in the output windings of each of the blocking oscillators. In this manner the output pulses are variable in polarity as well as in width in accordance with the modulating signal input. Alternatively, the modulating input may be a mechanical movement coupled to vary the position of biasing magnets positioned adjacent each of the cores in a differential manner.

Further advantages and features of this invention will become apparent upon consideration of the following description read in conjunction with the drawings wherein.

Figure 1:
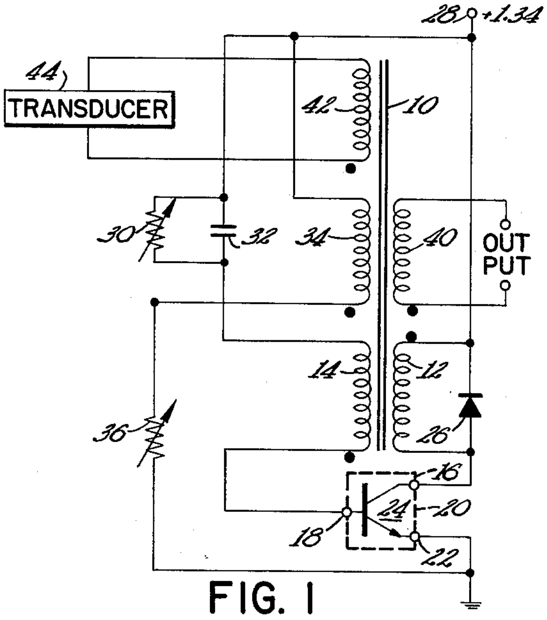
FIGURE 1 is a schematic diagram of one embodiment of a blocking oscillator pulse width modulator of this invention.
Figure 3:
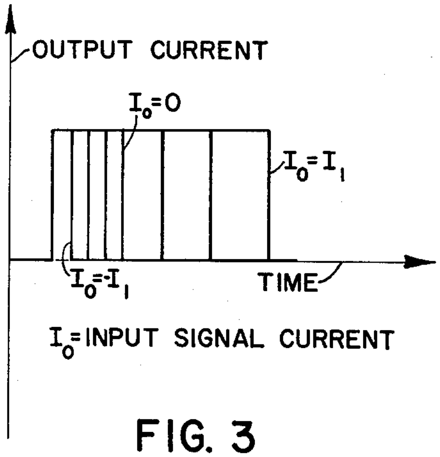
Figure 4:
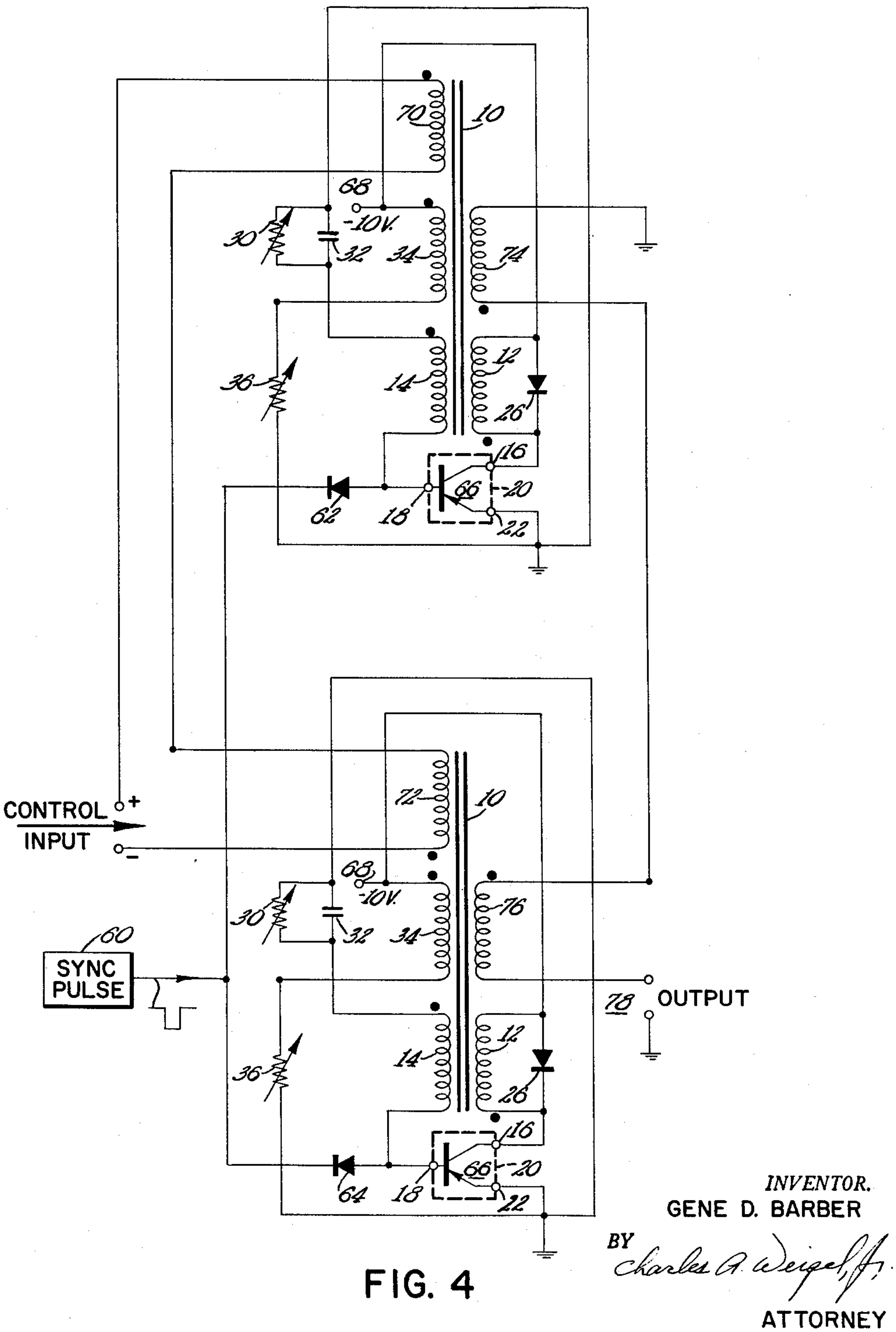

FIGURE 3 is a family of somewhat idealized curves illustrating the variation in width of the output signal of the circuit of FIGURE 1 as a function of the input signal polarity and amplitude; and FIGURE 4 is a schematic diagram of an alternative blocking oscillator pulse width modulator in accordance with this invention that is capable of providing output pulses that are variable in polarity as well as in width.

In FIG. 1, the blocking oscillator pulse width modulator includes a magnetic core 10. The magnetic core 10 may be made of any suitable magnetic material having a magnetic characteristic such as that illustrated in FIG. 2 (in which the magnetization, or flux density, B, is plotted against magnetic intensity H, or magnetizing force). Any other magnetic material that is saturable, such as tape wound cores or cores made of a magnetic film may also be used. The differential permeability, $\mu d$, of a core material is defined as the ratio of the incremental change of flux density $\Delta B$ resulting from an incremental change of magnetizing force $\Delta H$. Referring again to FIG. 2 this ratio is seen to be the slope of the curve. It is evident, therefore, that the differential permeability of the core changes with the magnitude and sense, or direction, of the magnetizing force ΔH applied thereto. It is also evident that the core has a quiescent magnetic operating point which may be defined as that point on the characteristic curve illustrated in FIG. 2 to which the core returns in the absence of a driving pulse. If the quiescent magnetic operating point of the core is along that portion of the magnetic characteristic having the greatest differential permeability, the pulse width modulator will have the greatest sensitivity as will be further described in an explanation of the operation of the circuit.

The pulse width modulator includes an oscillator primary winding 12 from which the output of the blocking oscillator is obtained and a feedback winding 14 to form a transformer feedback circuit arrangement between the output 16 and the input 18 of an amplifier 20 in such manner as to form a blocking oscillator. In FIG. 1 the amplifier 20 is illustrated as a transistor 24 having its collector electrode connected to the amplifier output 16 and its base electrode connected to the amplifier input 18. The oscillator primary winding 12 is connected in parallel with a diode 26 which operates to prevent inverse voltages across the winding 12 from damaging the transistor 24. The parallel combination comprising the oscillator primary winding 12 and the diode 26 are coupled between a source of potential 28 and the amplifier output 16 (collector electrode of the transistor 24).

The emitter electrode of the transistor 24 is grounded for common emitter operation and the amplifier input 18 (base electrode of the transistor 24) is coupled serially through the feedback winding 14 to a parallel timing circuit including a variable resistor 30 and a capacitor 32. This timing circuit is in turn connected to the source of potential 28 to complete the circuitry of the blocking oscillator. Thus far described, the circuit is that of a conventional blocking oscillator which operates as follows:

During a previous cycle the emitter-base junction of the transistor 24 may be reversed biased because of the charge acquired by the capacitor 32. This charge renders the transistor 24 non-conducting. As the charge on the capacitor 32 leaks off through the resistor 30, the biasing voltage is reduced to the point where the emitter-base junction of the transistor 24 becomes forward biased and the transistor 24 starts to conduct. As current begins to flow from the emitter to the collector of transistor 24, a magnetic field is set up about the windings 12 and 14 of the transformer and thus in the core 10. The dots at each winding are used in accordance with the usual convention.

In accordance with the convention, if a current flows through one winding so that the dot end is positive, the field set up in the core induces voltages in the other windings making the dot end positive in these windings at the same time. This field builds from zero to a maximum in direct proportion to the emitter-collector current of the transistor, and thus induces a voltage in the feedback winding 14 of the feedback transformer. This voltage, with the winding polarities as denoted by the dots, tends to increase the forward bias of the emitter-base junction of the transistor 24 and, due to the base current of the transistor 24, negatively charges the capacitor 32 while the field in the windings 12 and 14 is building up. Under these conditions, the transistor 24 is very rapidly driven into saturation. The flux in the core 10 continues to increase until the core 10 is driven to a condition of positive saturation (indicated in FIG. 2 by the point $P_s$). For an instant there is no induced voltage in the feedback winding 14. During this instant, the capacitor 32 begins to discharge through the resistor 30 in such a direction as to tend to reverse bias the base-emitter junction of the transistor 24. This in turn decreases the collector current and the field around the oscillator primary winding 12 starts to collapse thereby inducing a voltage in the feedback winding 14 in the reverse direction that tends further to reverse bias the base-emitter junction of the transistor 24. This condition maintains until the transistor 24 becomes cut off. Oscillation does not start again until the capacitor 32 becomes sufficiently discharged to again forward bias the emitter junction of the transistor 24.

The blocking oscillator operates at a frequency determined primarily by parallel R-C circuit including capacitor 32 and resistor 30. With each cycle of oscillation, the core 10 is rapidly driven in succession to a condition of positive saturation $P_s$ (FIG. 2) and then allowed to return to its quiescent magnetic operating point which, as will be described below, may or may not be the point of remanent magnetization $P_r$.

In accordance with one embodiment of the invention, an additional bias winding 34 is wound about the core 10 to produce the magnetic effect indicated by the dot shown at one end of the bias winding 34. The bias winding 34 and a variable resistor 36 are connected serially between the positive potential source 28 and ground; by varying the resistor 36 the quiescent magnetic operating point of the core 10 may be selectively varied from the point of remanent magnetization $P_r$ (FIG. 2) as desired. As previously mentioned, it is desirable that the core 10 be biased to have a maximum differential permeability. By referring to the curve of FIG. 2, it may be seen that the maximum differential permeability for the illustrative curve exists at the point of zero flux, i.e., $B=0$. It is at the point of zero flux that the curve of FIG. 2 has the greatest slope. In terms of operational specifics, the current through the bias winding 34 is adjusted to have a negative magnetizing force (illustrated as $-\Delta H_0$ in FIG. 2) such that the cessation of each output driving pulse from the blocking oscillator allows the core 10 to return to a condition of zero flux density (denoted in FIG. 2 by the point $P_o$). Since the core returns to this same condition of magnetization after each cycle of oscillation, the point $P_o$ is referred to as its quiescent operating point.

Figure 2:
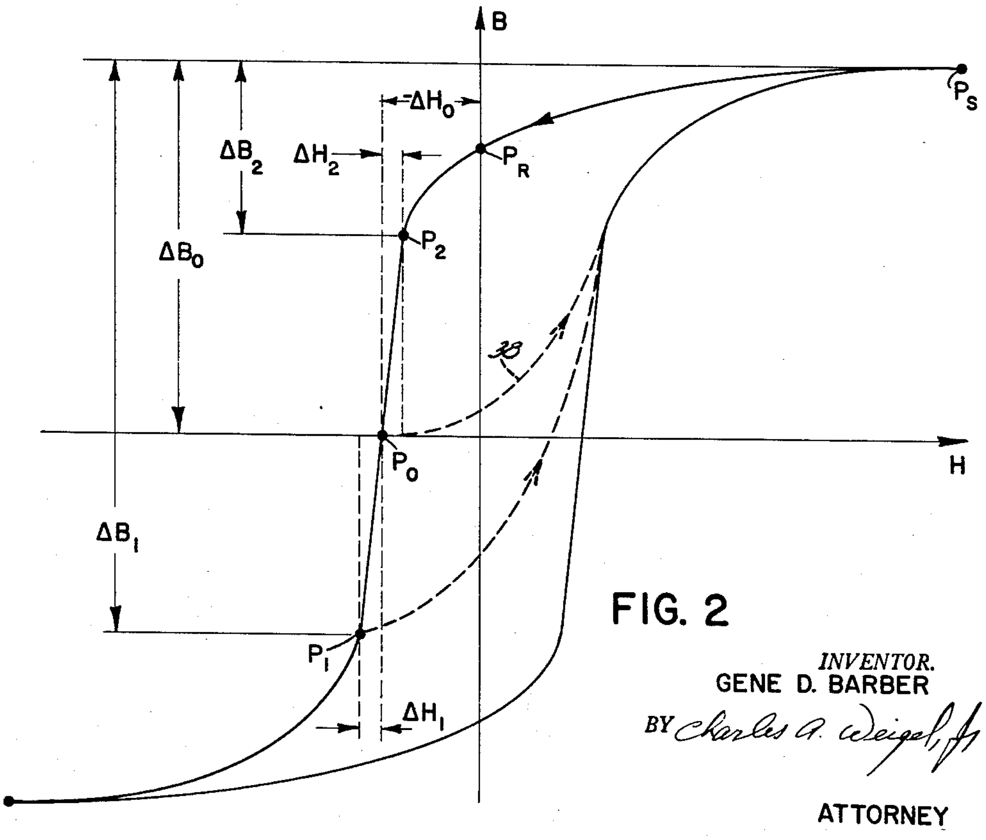
FIGURE 2 is a curve in which the flux density B is plotted against the magnetizing force H illustrating the magnetic characteristic of a typical magnetic core that may be utilized in the circuit of FIGURE 1.

Thus, during each cycle of the blocking oscillator, the core 10 is driven, by the application of a positive going magnetic intensity, from a condition of zero flux to a condition of saturation in one direction (which may be termed positive saturation) and then allowed to return to its condition of zero flux. In FIG. 2 this operation is illustrated beginning from its quiescent operating point $P_o$, along the dotted line 38 to the point of positive saturation $P_s$, thence back along the solid line to $P_o$. During each pulse from the blocking oscillator circuitry, the flux change in a particular direction, or sense, occurring in the core 10 is represented by the amount $\Delta B_0$ in FIG. 2. This flux change induces a substantially rectangular pulse in the output signal winding 40 as illustrated, for example, by the curve $I_0=0$ in FIG. 3. The curves in FIG. 3 represent the output voltage that is induced in the output signal winding 40 plotted against time for different magnitudes and polarities of input signal current applied to an input signal winding 42. Note that the output current waveforms are essentially rectangular, but vary in width.

The input signal winding 42 may be coupled to a transducer 44, such as a thermocouple or other device which produces an electrical signal indicative of a physical phenomenon or condition. As those skilled in the art will readily appreciate, the input signal winding 42 is adaptable to accept input signals from any desired control or modulating signal source or other suitable source.

In accordance with the invention, if the current in the input signal winding 42 varies from a value other than zero, the output pulses induced in the output winding 40, during each cycle of the blocking oscillator, vary correspondingly in width. For example, if the current applied to the input winding 42 from the transducer 44 is increased in such a direction that tends to make the dot end of the input winding 42 more negative, the magnetic intensity applied to the core 10 increases in a negative going direction, or sense. The quiescent operating point for the core 10 thereby is shifted in a negative going sense such that the total flux in the core reverses direction. This change is illustrated in FIG. 2 as a negative going magnetic intensity $\Delta H_1$ causing a negative going total flux in the core such that the new quisecent operating point $P_1$ is located in the third quadrant of the magnetic characteristic. With the advent of the next succeeding drive pulse from the blocking oscillator, the core 10 is driven by a positive going magnetic intensity from its new quiescent operating point $P_1$, close to a state of negative saturation, to positive saturation $P_s$ and then allowed to return to its new quiescent operating point $P_1$. The total flux change occurring during this drive pulse is thus greater (represented by the amount $\Delta B_1$ in FIG. 2) than that which occurred in the absence of an input signal. This in turn widens the output pulse, to that represented by the shape of the curve in FIG. 3 of $I_0=I_1$.

Conversely, if the input current applied to the input signal winding 42 is reversed, the quiescent operating point of the core 10 is shifted in the opposite direction, or sense, such that the flux change occurring during each cycle of the blocking oscillator is decreased. This results in a corresponding decrease in the width of the output pulse at the output winding 40. For example, the output waveform may be of the shape represented by the curve in FIG. 3 by $I_0=-I_1$.

The manner in which the width of the pulse varies as a function of the input signal magnitude may be demonstrated mathematically as follows:

It is well known that $$e=N_{12}\frac{d\phi}{dt}10^{-8}$$

in which $e$ is the voltage impressed across the oscillator winding 12 during each cycle of oscillation, $N_{12}$ is the number of turns in winding 12, $d\phi$ is the change in magnetic flux in the core 10 and is equal to the area of the core multiplied by $dB$, the change in flux density and $dt$ is the time interval in which the flux change takes place. Since, as stated above, the transistor 24 is rapidly driven into saturation with each cycle of the blocking oscillator, $e$ is essentially constant and approximately equal to the supply voltage applied to terminal 28.

The above equation can be rewritten in the form:

$$dt=\frac{N_{12}A}{e}dB10^{-8}$$

to give the time duration of the pulses for a given $dB$, where A is the cross section area of the core. Now, since $dB=\mu d\ dH$ and $$dH=\frac{.4\pi Ndi}{L}$$

where N is the number of turns in a winding, $di$ is the change in current in that winding corresponding to an input signal, and L is the magnetic path length around the core, the following formula is obtained:

$$dt=\frac{N_{12}A\mu d(.4\pi)Ndi}{eL}10^{-8}\ \text{second}$$

In the above equation N can refer to the number of turns and $di$ the D.C. current change in any winding about the core, in the usual case it will refer to the input and bias windings 42 and 34. In this equation all quantities are normally fixed except $\mu d$. The differential permeability $\mu d$ will have, for example, different values at $P_r$ and $P_o$. There may be a region, however, such as that shown about $P_o$ where the slope is constant. To the extent that this slope is constant, the variation in pulse width is proportional to the variation in transducer current or magnetic bias applied to the core.

It is apparent that the output pulse width may not always be a linear function of the input signal current. However, the relationship between the input signal current and the pulse width is one that can be determined and, if desired, the input current from the transducer 44, for example, may be applied through a function generator to provide an input signal that varies inversely with the permeability of the core such that the output pulse width is a linear function of the input signal current.

It is thus apparent that the circuit of FIG. 1 operates independently of outside influence to provide successive output pulses that vary in width in accordance with the amplitude and sense of an input signal. Further, by adjusting the quiescent operating point of the core 10, the sensitivity of the circuit may be made quite high so as to respond to relatively low level signals. In this manner the circuit of FIG. 1 becomes a self-contained, sensitive pulse width modulator employing a blocking oscillator. The amplifier of blocking oscillator 20 may be a vacuum tube or other active element rather than the transistor illustrated. Alternatively, the transistor may be coupled as a common collector or common base amplifier.

If desired, a clipper circuit may be connected across the output signal winding 40 to maintain the output pulses essentially at a constant amplitude although this is seldom required.

Although the quiescent magnetic operating point of this circuit is illustrated and described as being varied electrically by the biasing or modulating input signal, it is in the scope of this invention to vary the operating point mechanically. Thus, in place of the biasing winding 34 and the input winding 42, one or more permanent magnets may be associated with the core 10 to vary its quiescent magnetic operating point. This allows the coupling of a mechanical member, such as a pressure diaphragm, to be coupled to transmit motion to a permanent magnet. The permanent magnet may be placed adjacent the core 10 so as to vary the quiescent magnetic operating point of the core 10 in accordance with the mechanical motion. In this manner, the width of the output pulses is modulated by the mechanical input in the same manner as with an electrical input. The permanent magnet may be made of any material having a sufficient high retentivity to be relatively insensitive to the magnetic flux changes normally occurring in the circuit of FIGURE 1. The permanent magnets may be designed to form a portion of the core 10 itself. For example, the core 10 may be formed with an air gap in which the input magnets may be placed.

The circuit illustrated in FIG. 4 is quite similar to that of FIG. 1. One primary difference between the two figures is that the circuit of FIG. 4 employs two blocking oscillators (rather than one). These blocking oscillators are operated synchronously by synchronizing pulses from a source of pulses 60 applied through separate diodes 62 and 64 to the input 18 of the amplifiers. Another difference is that the feedback circuit of each blocking oscillator, which includes the feedback winding 14 and the R-C timing circuit 30–32, is usually returned to ground rather than to the source of positive potential 28 as in FIG. 1. Identical parts have been given the same numbers.

The blocking oscillator portion of the circuitry operates in substantially the same manner as that described in conjunction with FIG. 1. The circuit of FIG. 4, however, illustrates the use of a PNP transistor 66 in place of the NPN transistor 24 illustrated in FIG. 1. To accommodate the PNP transistor 66, the oscillator primary winding 12 along with the bias winding 34 are coupled to a negative source of potential 68. Also the direction of winding of each of the windings 12, 14 and 34 is reversed to accommodate the opposite conductivity type transistor employed. It should be noted that if the direction of windings in FIG. 4 had been as illustrated in FIG. 1, the only change to have occurred would be that, with each cycle of the blocking oscillator, the core 10 would have been driven to negative rather than positive saturation. With the changes in winding direction, the operation of the blocking oscillator portion of the circuit is the same, i.e., a pulse occurs with each cycle of the blocking oscillator which tends to drive the core 10 from its quiescent operating point in a positive sense to positive saturation after which each core 10 is again allowed to return to its quiescent operating point.

The modifications made in FIG. 4 which allow the input signal to vary the polarity as well as the width of the successive output pulses will now be described specifically.

The signal input windings 70 and 72 are wound in opposite directions on each of the cores 10 of the respective first and second (lower and upper positions, respectively in the drawing) blocking oscillators. The input signal windings are connected in series and to the input signal terminals such as a transducer 44 (FIG. 1). In this manner, the input signal windings 70 and 72, respectively, operate differentially to vary the quiescent magnetic operating point of the core 10 in one direction, or sense, in the first blocking oscillator and in the opposite direction, or sense, in the second blocking oscillator. Thus, if the input signal has the polarity indicated, thereby causing current to flow in such direction as to make the dot end of the second input winding 70 positive with respect to the non-dot end and in such direction as to make the dot end of the first input winding 72 negative with respect to the non-dot end, the core 10 for the first blocking oscillator is biased by a positive going magnetic intensity ($\Delta H_2$ in FIG. 2). This positive going magnetic intensity moves the quiescent operating point of the core of the second blocking oscillator in a direction toward positive saturation by an amount determined by the magnitude of the input signal (to point $P_2$ in FIG. 2). Similarly, the core 10 of the first blocking oscillator is biased in a negative going sense by a similar amount (to the point $P_1$ in FIG. 2) such as to establish a quiescent operating point near negative saturation of the core.

With these new operating points, as each of the cores are successively driven to positive saturation, the flux changes taking place in each core differ. Thus, the core 10 in the second blocking oscillator, having a quiescent operating point that is close to positive saturation (at the point $P_2$ in FIG. 2), undergoes a relatively small flux change (represented in FIG. 2 by $\Delta B_2$). On the other hand, the periodic flux change taking place in the core 10 of the first blocking oscillator having a quiescent operating point that is close to negative saturation is considerably greater (as represented by the amount $\Delta B_1$ in FIG. 2). These flux changes induce voltages in the output windings 74 and 76. Since the output windings 74 and 76 oppositely are wound and connected in series to the output terminals 78, the voltages induced therein subtract algebraically such that the voltage appearing at the output terminals 78 is proportional to the differential flux changes occurring in the respective cores. The amplitude of the output voltage does not vary, however, and the output pulse duration is proportional to $\Delta B_1$ minus $\Delta B_2$ (FIG. 2), and positive with respect to ground.

If on the other hand, the polarity of the input signal is reversed, the flux change occurring in the second oscillator core 10 becomes larger than the flux change occurring in the first oscillator core 10 thereby producing output pulses that are negative going and that have a pulse width proportional to the input signal as described above (as long as the cores are operated over the linear portion of their magnetic characteristic as described above).

As in the case illustrated in FIG. 1, varying the quiescent operating point of the cores 10 may be achieved by the use of permanent magnets associated with each of the cores. The magnets are operated differentially such that the flux in each of the cores 10 is varied in an opposite sense in accordance with the modulating input.

Also the initial biasing function may be performed by permanent magnets.

Although this invention has been disclosed and illustrated with reference to particular applications and circuitry, it is susceptible of numerous other applications which will be apparent to one skilled in the art. For example, although grounded emitter amplifiers have been illustrated for the amplifier portion of the blocking oscillators, grounded base, or grounded collector transistor amplifiers or vacuum tubes could be used just as well. It should also be apparent that plural input windings could be employed to sense or compare a summation of inputs rather than a single input signal winding. Further, the input windings may have varying turn ratios such that signals of different orders of magnitude may be compared. The scope of the inventive concept is, therefore, not limited to the specific embodiment described and illustrated for purposes of explanation.

There has thus been described a relatively simple self-contained pulse width modulator capable of generating output pulses having a width (and polarity) that is variable in accordance with the polarity and amplitude of an input magnetic flux being detected. The modulator, which may be used as a detector, has a relatively high sensitivity, particularly if the cores are biased to have a quiescent operating point occurring at the point of maximum differential permeability. Also, due to the transformer action, the input as well as the output circuits are effectively isolated from each other and may provide an output signal of either polarity. In addition, the modulator output pulses are relatively stable in amplitude and frequency, varying only in width. Finally, the input flux may be established by an electrical, electromagnetic or mechanical input.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A pulse width modulator including a free running blocking oscillator adapted to generate output pulses of variable width in accordance with the magnitude of an input signal, said oscillator including a magnetic core, means responsive to the output of said oscillator for successively varying the magnetic flux in said core in a predetermined sense, and means responsive to said input signal for establishing a quiescent magnetic flux in said core proportional to said input signal, additional means associated with said magnetic core for magnetically biasing said core to have a quiescent magnetic operating point of zero flux density, whereby the sensitivity of said circuit to said input signal is increased, and output means responsive to the resultant magnetic flux change in said core for providing output pulses each having a width related to the magnitude of said input signal.

2. A pulse modulator including a blocking oscillator for generating output pulses each having a width that is variable in accordance with an input signal, the regenerative feedback portion of said oscillator including: a transformer having a saturable magnetic core, means for magnetically biasing said saturable magnetic core whereby to establish a predetermined quiescent magnetic operating point for said core, means responsive to the output of said oscillator for successively driving said core to magnetic saturation in a predetermined sense thereby varying the flux in said core by a predetermined amount, and separate means responsive to said input signal for varying said quiescent magnetic operating point in accordance with said input signal whereby to vary said predetermined amount of flux change, and output means responsive to the resultant magnetic flux change in said core for providing output pulses each having a width related to the magnitude and polarity of said input signal.

3. A magnetic circuit for providing successive output pulses each having a width and polarity that varies in accordance with the amplitude and polarity of an input signal, said circuit comprising, in combination: a first blocking oscillator; a second blocking oscillator; means coupled to said first and second blocking oscillators to maintain their oscillations in phase synchronism; each of said blocking oscillators including a transformer having a magnetic core and means coupled to the individual cores of each of said blocking oscillators for successively varying the flux in each of said cores in a predetermined sense; means including separate serially connected input signal windings associated with each of said cores and responsive to said input signal for varying the magnetic flux in each of said cores in opposite senses; and means including separate serially connected output signal windings associated with each of said cores and responsive to the resultant magnetic flux change occurring in each of said cores for providing successive output pulses each having a width and polarity that is related to the instantaneous magnitude and polarity of said input signal.

4. The circuit set forth in claim 3 which includes additional means having separate bias current windings associated with each of said cores for magnetically biasing each of said cores to a quiescent magnetic operating point such as to increase the differential permeability of each of said cores.

5. A magnetic circuit for providing sequential output pulses each having a width and polarity that is variable in accordance with the amplitude and polarity of an input signal, said circuit comprising, in combination, a first blocking oscillator circuit, a second blocking oscillator circuit, a source of synchronized pulses, each of said blocking oscillators have an input coupled to said source of synchronizing pulses whereby the phase and rate of oscillation of each of said blocking oscillators is maintained in synchronism, each of said blocking oscillators having an output circuit that includes a magnetic core and a winding associated therewith for periodically varying the magnetic flux in each of said individual cores in accordance with the oscillations of the respective blocking oscillators, a first output signal winding associated with said first magnetic core, a second output signal winding associated with said second magnetic core, said first and second output signal windings being connected differentially and in series, a first input signal winding associated with said first magnetic core, a second input signal winding associated with said second magnetic core, said first and said second input signal windings being connected differentially and in series and responsive to said input signal, whereby there is available from across said serially connected output windings output pulses each having a width and polarity that is related to the instantaneous magnitude of said input signal.

6. A pulse width modulator including a free running blocking oscillator adapted to generate output pulses of variable width in accordance with the magnitude of an input signal;

said oscillator including a magnetic core, means responsive to the output of said oscillator for successively varying the magnetic flux in said core in a predetermined sense, and means responsive to said input signal for establishing a quiescent magnetic flux in said core proportional to said input signal;

additional means associated with said magnetic core for magnetically biasing said core to have a quiescent operating point at which the differential permeability of said core is a maximum, whereby the sensitivity of said circuit to said input signal is a maximum;

and output means responsive to the resultant magnetic flux change in said core for providing output pulses each having a width related to the magnitude of said input signal.

References Cited in the file of this patent

UNITED STATES PATENTS

| | | |
|---|---|---|
| 2,486,021 | Gross | Oct. 25, 1949 |
| 2,875,412 | Kaplan | Feb. 24, 1959 |
| 2,915,710 | Schiewe et al. | Dec. 1, 1959 |

OTHER REFERENCES

Spinrad: "Core Saturation Blocking Oscillator Control," vol. 30, August 1959, The Review of Scientific Instruments.